United States Patent
Hartmann et al.

(10) Patent No.: US 6,517,301 B2
(45) Date of Patent: Feb. 11, 2003

(54) FASTENER ASSEMBLY INCLUDING A SCREW ELEMENT AND A SUPPORTING ELEMENT

(75) Inventors: Gunther Hartmann, Alsfeld (DE); Wolfgang Sommer, Gemuenden (DE); Frank Wagner, Grossen Buseck (DE)

(73) Assignee: Kamax-Werke Rudolf Kellermann GmbH & Co. KG, Osterode (DE)

( * ) Notice: Subject to any disclaimer, the term of this patent is extended or adjusted under 35 U.S.C. 154(b) by 0 days.

(21) Appl. No.: 09/902,009

(22) Filed: Jul. 10, 2001

(65) Prior Publication Data

US 2002/0015628 A1 Feb. 7, 2002

(30) Foreign Application Priority Data

Jul. 18, 2000 (DE) .......................... 100 34 748

(51) Int. Cl.$^7$ ................ F16B 37/08; F16B 39/24
(52) U.S. Cl. ............... 411/136; 411/368; 411/432; 411/533
(58) Field of Search ................. 411/136, 134, 411/149, 150, 533, 537, 432, 368

(56) References Cited

U.S. PATENT DOCUMENTS

| | | | |
|---|---|---|---|
| 2,161,740 A | * | 6/1939 | Eksergian ............ 411/537 |
| 3,263,727 A | | 8/1966 | Herpolsheimer |
| 4,034,788 A | * | 7/1977 | Melone .............. 411/134 |
| 4,704,058 A | * | 11/1987 | Crunwell ............ 411/149 X |
| 5,090,855 A | | 2/1992 | Terry ............... 411/144 |
| 5,190,423 A | * | 3/1993 | Ewing .............. 411/149 X |
| 5,203,656 A | * | 4/1993 | McKinlay ........... 411/149 |
| 5,626,449 A | * | 5/1997 | McKinlay ........... 411/149 |
| 5,688,091 A | * | 11/1997 | McKinlay ........... 411/149 |
| 5,967,724 A | * | 10/1999 | Terry .............. 411/149 |
| 6,039,524 A | * | 3/2000 | McKinlay ........... 411/149 |
| 6,106,077 A | * | 8/2000 | Kluge et al. ........ 411/533 X |

FOREIGN PATENT DOCUMENTS

| | | |
|---|---|---|
| DE | 24 13 760 A | 3/1974 |
| DE | 82 02 613 U1 | 2/1983 |
| DE | 44 29 312 A1 | 8/1994 |
| EP | 0 131 556 B1 | 6/1984 |
| EP | 0 836 016 A3 | 4/1998 |
| GB | 2 136 077 A | 3/1983 |

OTHER PUBLICATIONS

European Search Report.

* cited by examiner

*Primary Examiner*—Neill Wilson
(74) *Attorney, Agent, or Firm*—Thomas, Kayden, Horstemeyer & Risley

(57) ABSTRACT

A fastener assembly for a wheel of a vehicle includes a screw element including a threaded portion, a first supporting surface and a number of first wedge shaped teeth being located at the supporting surface. A supporting element is rotatably connected to the screw element. The supporting element includes a second supporting surface and a number of second wedge shaped teeth being associated with the first wedge shaped teeth. The first wedge shaped teeth are located at the first supporting surface to face the supporting element and the second wedge shaped teeth are located at the second supporting surface to face the screw element. The first and second wedge shaped teeth are designed and arranged in a way to realize positive engagement between the screw element and the supporting element when the fastener assembly is being tightened and to make the first and second wedge shaped teeth slide on each other and to press the screw element and the supporting element apart when the fastener assembly is being loosened.

15 Claims, 5 Drawing Sheets

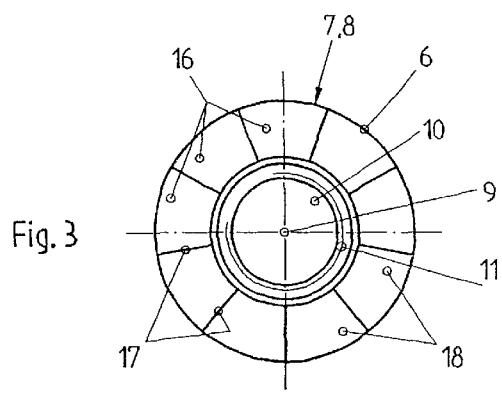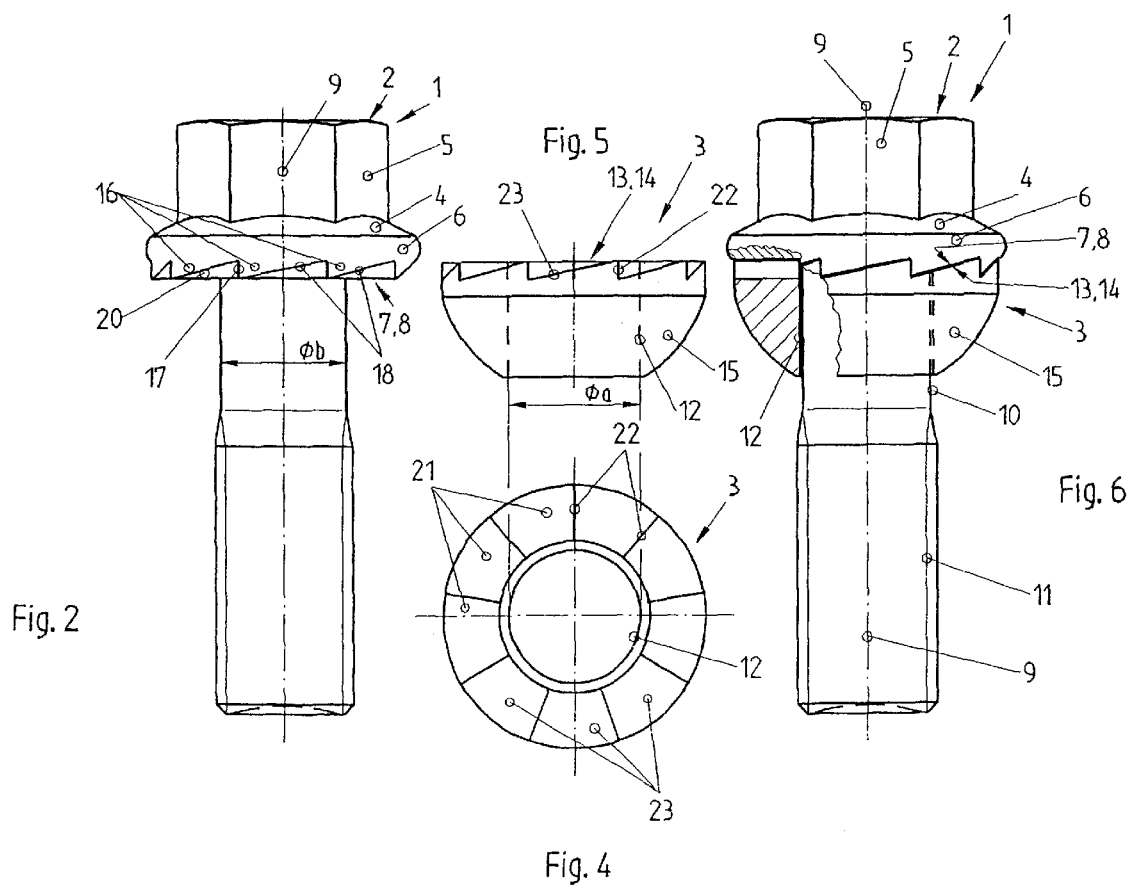

FASTENER ASSEMBLY INCLUDING A SCREW ELEMENT AND A SUPPORTING ELEMENT

CROSS REFERENCE TO RELATED APPLICATIONS

This application claims the benefit of co-pending German Patent Application No. 100 34 748.7 entitled "Lösbares Verbindungselement für ein Fahrzeug, mit einem Schraubteil und einem Stützring", filed on Jul. 7, 2000.

FIELD OF THE INVENTION

The present invention generally relates to a detachable fastener assembly for a wheel of a vehicle. More particularly, the present invention relates to a fastener assembly which includes a screw element including a threaded portion and a supporting ring being rotatably connected to the screw element.

BACKGROUND OF THE INVENTION

Fastener assemblies including a screw element and a supporting ring are used to mount wheels to a hub of an axle of a vehicle. The screw element usually is a wheel bolt. However, it may also be a wheel nut also being associates with a supporting ring. In most cases, the supporting ring is captively connected to the screw element to facilitate assembly. The assembly is designed in a way that the supporting ring may not only be rotated with respect to the screw element, but the axes may also be dislocated with respect to one another in a radial direction within a predetermined play. However, this dislocation only takes place within a small region, as it, for example, makes sense to compensate dividing errors of the opening of the wheel rim and/or of the hub.

A detachable fastener assembly in the form of a wheel bolt is known from European patent application No. 0 836 016 A2. The wheel bolt includes a head and a shank including a threaded portion. The head of the wheel bolt at its side facing a supporting ring includes a supporting surface to transmit an axial force to the supporting ring. The supporting surface is designed as a plane surface. The supporting ring also includes a plane counter supporting surface being associated therewith. At its other side facing the vehicle, the supporting ring includes a non-planar bearing surface to transmit the axial force to the wheel of the vehicle. The bearing surface has a truncated cone design or a spherical design. The supporting ring is rotatably and captively connected to the wheel bolt by a calked surface. Usually, four calked surfaces are spaced apart over the circumference. The supporting ring is to be connected to the wheel bolt by the calked surface, and in a way that it may be turned with respect to the shank of the wheel bolt and that there is few friction between the supporting ring and the head of the screw when the wheels is affixed. The supporting ring may be made of a light metal alloy, whereas the wheel bolt is made of steel. In combination with the wheel of the vehicle being made of magnesium, an occurrence of contact corrosion between the supporting ring and the wheel of the vehicle is prevented. It may make sense to design the fastener assembly in a way that there only is few friction between the supporting ring and the screw head when the wheel is affixed. However, this low friction is disadvantageous with respect to unintentional loosening of the wheel bolts. With such known fastener assemblies, there is the special danger of unintentional loosening in case of transverse loads. This danger is especially important if one takes into account increasing engine power and vehicle weight. Consequently, the fastener assembly is subjected to substantial transverse loads during acceleration and braking. Additionally, there is the danger of such known fastener assemblies setting, especially due to unpreventable vibrations and oscillations prevailing at the vehicle. Thus, the axial force is reduced. In case of respective transverse loads, this leads to an evermore increased tendency of the known faster assembly to unintentionally loosen.

On the other hand, screws in which the supporting surface below the head has a special design to reduce the danger of unintentional loosening in case of loads are known. The supporting surface below the head includes a tooth arrangement including wedge shaped teeth. The tooth arrangement has a design in a way that the screw may be tightened comparatively easily due to slightly inclined surfaces of the tooth arrangement sliding over a component, while the teeth dig in the material of the component to be affixed after the tightening process has been finished and under prevailing load conditions. Consequently, this causes increased resistance which has to be overcome during loosening and unscrewing of the screw. The tooth arrangement desires a sliding movement of the supporting surface on the component when the screw is being tightened. On the other hand, during loosening and unscrewing, conditions requiring an increased loosening moment are desired to overcome a form-fit. The combination of the material of the screw and of the component has to be coordinated. It is to be understood that only the known screw includes a tooth arrangement, whereas the component has a plane or a flat supporting surface. In this way, unintentional loosening of the screw is usually prevented due to an increase of the friction between the supporting surface of the head of the screw and the respective counter surface of the component. On the other hand, intentional loosening of the screw by applying a respectively increased loosening moment is possible. A multiple use of such a known screw is limited.

Lock washer assemblies which are used in combination with a screw are known from German patent document No. 24 13 760, U.S. Pat. No. 3,263,727 and European patent document No. 0 131 556. The lock washer assemblies include two superposing washers which may have an identical design and which are supported on one another in a point-symmetric way. The two washers are located between the plane supporting surface being located at the head of the screw and the plane supporting surface being located at the component. The two washers at their outwardly facing surfaces, meaning the supporting surface facing the head, on the one hand, and the supporting surface facing the component, and the other hand, include a tooth arrangement which increases friction. The tooth arrangement includes a number of radial ribs or the like. The two washers at their sides facing one another each include a tooth arrangement including wedge shaped teeth. The tooth arrangements include inclined plane surface portions and possibly additional surface portions which are directed perpendicular with respect to the axis of the washer assembly and of the screw, respectively. The inclined surface portions are arranged at different inclination angles in the direction of the circumference to realize form-fit between the two washers when the screw is being tightened. When the screw is being rotated in the loosening direction, the respective wedge surfaces slide on one another in a way of an inclined plane to increase the axial force. During loosening or untightening of the connection, the increased axial force has to be overcome.

The manufacture of such known washer assemblies is expensive, and the number of elements used for the connection is increased. In addition to the screw, the two washers have to be handled and, more importantly, they have to be mounted in the correct orientation. The washers are separate components which are not captive. The use of separate washers in combination with detachable screws has the further disadvantage of the number of parting lines and setting lines between the respective elements of the connection being increased. The greater the number of these lines is, the higher is the setting value of the connection caused thereby which results in a dangerous reduction of the axial force. This is especially the case when the elements used for the connection have a certain surface design, for example a coating reducing corrosion or the like, and when these elements are subjected to increased temperatures during operation. It is to be understood that such known separate washer assemblies are not suitable as detachable fastener assemblies for the attachment of the wheel of a vehicle since the respective bearing surface at the wheel rim has a conical or spherical shape, meaning a non-planar bearing surface. Due to the fact that such wheel bolts or wheel nuts are loosened and tightened very often, there are special conditions in which the washer assembly cannot be applied.

Furthermore, it has to be taken into account that the use of wheel bolts or wheel nuts as detachable fastening elements for wheels of a vehicle takes place under conditions which promote corrosion. To improve corrosion properties, it is known to apply a coating on the wheel bolts and on the supporting rings. For example, the coating is a zinc lamella coating including plastic components and metal particles, especially zinc, aluminum and the like, which are contained therein. Such coatings improve corrosion properties, but, at the same time, setting properties deteriorate. The respective setting values occurring at such connecting elements increase with an increasing number of separating lines being located between the elements and with an increase of the thickness of the coating.

SUMMARY OF THE INVENTION

The present invention relates to detachable fastener assembly for a wheel of a vehicle. The fastener assembly includes a screw element including a threaded portion, a first supporting surface and a number of first wedge shaped teeth being located at the supporting surface. A supporting ring is rotatably connected to the screw element. The first supporting surface is designed and arranged to transmit an axial force to the supporting ring. The supporting ring includes a second supporting surface, a non-planar bearing surface being designed to transmit an axial force onto a wheel of a vehicle in the mounted position and a number of second wedge shaped teeth being associated with the first wedge shaped teeth. The first wedge shaped teeth are located at the first supporting surface to face the supporting ring and the second wedge shaped teeth are located at the second supporting surface to face the screw element. The first and second wedge shaped teeth are designed and arranged in a way to realize positive engagement between the screw element and the supporting ring when the fastener assembly is being tightened and to make the first and second wedge shaped teeth slide on one another and to press the screw element and the supporting ring apart under an increase of the axial force when the fastener assembly is being loosened.

With the novel fastener assembly, the known detachable fastener assemblies in the form of wheel bolts and wheel nuts including a supporting ring are improved without increasing the number of elements. The application of a tooth arrangement including wedge shaped teeth results in an increase of the axial force in case of unintentional loosening. Consequently, the novel arrangement counteracts unintentional loosening in case of increased loads. In known fastening assemblies, transverse forces subjecting the elements of the fastening assembly in case of respective loads usually lead to unintentional loosening of the screw element. In the novel fastening assembly, the loosening movement is terminated by the sliding movement of the two tooth arrangement on one another, and a further decrease of the preloading force is prevented. Due to this unpreventable loosening movement in case of transverse loads, an axial movement and a tangential movement of the screw element with respect to the supporting ring takes place in the novel fastening assembly in combination with the tooth arrangements. As a result, the loss of preloading forces is advantageously compensated. This especially applies when the preloading force has already been reduced due to unpreventable setting effects, and when the portion of the transverse force being transmittable between the connected elements (namely the wheel rim and the hub) due to friction, has been reduced. It is a similar case when the wheel connection has not been tightened with the prescribed torque during inappropriate maintenance service and the preloading force level necessary for a secure connection has not been reached. Insofar, the present invention also improves driving safety.

With the novel fastener assembly, it is possible to securely fix the wheel to a motor vehicle, even in case of great engine power, great vehicle weight and extremely loaded wheels of the vehicle. The detachable fastener assembly only includes a small number of components, it may be assembled simply and safely and it may be used several times.

Due to the arrangement of the first tooth arrangement at the screw element, meaning for example the wheel bolt or the wheel nut, and of the second tooth arrangement at the supporting ring, the number of elements used in the fastener assembly is not increased compared to the prior art. The number of setting lines does not differ from the one of a known fastener assembly including a wheel bolt and a supporting ring. Consequently, increased setting values do not have to be taken into account when the elements are protected against corrosion, for example by a zinc lamella coating. The novel fastener assembly overcompensates the disadvantage resulting from a zinc lamella coating.

The supporting ring may be captively connected to the wheel bolt or the wheel nut. To be captively connected means that the supporting ring may not unintentionally be detached from the wheel bolt or the wheel nut. In this way, one attains an assembly unit which is easy to handle and which may be used and operated as one complete unit. The novel fastener assembly may for example be handled by robots, especially during first assembly.

Another advantage of the novel fastener assembly is the fact that an increased clamping length is maintained due to the use of the supporting ring. The wheel bolt has an elastic design which has the positive effect of maintaining the axial force, especially in case of setting effects occurring in the fastener assembly. This effect may be further supported by choosing a more elastic materiel for the supporting ring compared to the materiel of the screw element or by designing the supporting ring as a hollow body. It may be advantageous to design the form surfaces of the tooth arrangement below the head of the screw element to be conical with respect to the axis of the screw element and to attain a disc-spring-like effect by a respective design of the counter surface.

In case of a plane design of the tooth arrangement, the novel fastener assembly allows for a compensation of tolerances. The supporting rings may adapt to the respective conditions prevailing at the counter surface being located at the wheel. Great preloading forces may be applied and comparatively great remaining preloading forces occur during operation. The clamping forces may be transmitted to the wheel rim in more uniform way.

Another advantage of the novel fastener assembly is the fact that the loosening and untightening moments have a reduced value and a reduced spreading compared to usually occurring extremely great loosening and untightening moments being caused by corrosion effects. In the novel fastener assembly, the loosening moment being required to loosen the screw element may be adjusted to be less than the frictional moment between the supporting ring and the wheel of the vehicle. This effect is attained in a simple way and with great exactness by a respective design of the surfaces, a respective choice of materials and the like. This is especially advantageous in case of having to change a wheel due to an accident or a breakdown of the vehicle. Usually, such a change of tires has to be realized by the driver by means of simple tools which are carried on the vehicle.

The first and second tooth arrangements including wedge shaped teeth are designed and arranged to be asymmetric in a circumferential direction. Each tooth includes two form surfaces being inclined in a circumferential direction. The form surfaces contacting one another in the tightening direction are arranged at a comparatively great average tangent angle to attain the desired form-fit. The form surfaces contacting one another in the loosening direction are arranged at a comparatively small average tangent angle to achieve the desired sliding movement. It is to be understood that the tangent angles—as seen from the decisive direction—may change locally in case the form surfaces are designed as non-planar surfaces. This means that the term "non-planar surfaces" has to be understood throughout this application in a special way. Cutting the fastener assembly cylindrically around its axis and putting the image into a planar area shows a straight cutting line generated by the cylindrical cutting area and the form surfaces, especially the form surfaces acting in the loosening direction, even in case the form surfaces are designed as threadlike non-planar surfaces. However, if there is a "non-planar surface" in the sense of this application, a non-straight line, i.e. a curved or an angled line, appears as a cutting line in the circumferential direction, which at the same time means that the tangent angle in the circumferential direction is not constant.

The form surfaces of the tooth arrangements may have different designs. The form surfaces may not only have a plane design, but also a non-planar design, for example a ball-like, involute or the like design. The tooth arrangements including wedge shaped teeth do not have to extend over the entity of the surfaces at the screw element and at the supporting ring, but they may also be designed to only cover a portion of these surfaces. It is also possible to design radial, plane surface portions. It is important that the tooth arrangements have different properties depending on the respective sense of rotation. It is desired to attain a form-fit or a positive engagement in the tightening sense of rotation. In a direction opposite the tightening direction, meaning the loosening direction, the effect of an inclined plane is to be used to prevent a decrease of the axial force.

Furthermore, it is desired that the respective effective tangent angle of the second form surfaces contacting one another in a loosening sense of rotation is more than a helix angle of the threaded portion of the screw element. This is at least desired for the first portion of the tooth arrangements in the loosening direction.

The second form surfaces of the screw element and/or the supporting ring contacting one another to attain the sliding movement in the loosening sense of rotation may be designed to be at least partially non-planar surfaces. The form surfaces include different tangent angles, but not one constant tangent angle. The tangent angle in the loosening sense of rotation starts with a small tangent angle however being larger than the helix angle of the threaded portion. Then, in circumferential direction, the tangent angle becomes greater. The tangent angle may become very great, similar up to a size like the acting tangent angle in the tightening sense of rotation. This design prevents the slide of the wedge shaped teeth to one another and the corresponding wear. Thus, the fastener assembly may be used several times again and again. In this case, one is capable of influencing the loosening moment during intentional unscrewing and during unintentional loosening by the design of these form surfaces and their geometry in a circumferential direction, due to settling effects also.

The supporting ring may connected to the screw element to be captive but movable. Movability relates to a possible dislocation occurring between the screw element and the supporting ring to allow for a compensation of dividing errors. There are a number of possibilities of achieving the captive connection. A simple possibility is to first push the supporting ring over the shank of the screw element and to then produce the thread at the threaded portion by rolling. The outer diameter of the thread will be more than the inner diameter of the bore of the supporting ring. It is also possible to later produce a securing channel, a protrusion or the like at the shank of the screw element by rolling. Another exemplary possibility is to calk the supporting ring.

The non-planar bearing surface of the supporting ring which serves to transmit the axial force to the wheel of the vehicle may be designed to have an increased frictional moment. This design desires to provide a greater frictional moment between the wheel of the vehicle and the supporting ring than between the supporting ring and the screw element to attain a movement in the region of the tooth arrangements due to unintentional loosening under load and to use the positive reclamping effects. This at least applies to the beginning portion in which unintentional loosening takes place under the effects of transverse forces. The friction between the first supporting surface of the screw element and the supporting ring may be made smaller than the friction and the corresponding moment respectively between the supporting ring and the wheel of the vehicle by designing the surfaces more smooth or by the aid of grease.

There are a number of possibilities of realizing the above-described design. It is possible that the non-planar bearing surface of the supporting ring includes a number of ribs, elongated protrusions or the like to increase friction. A respective design of the surface of the wheel of the vehicle with which the non-planar bearing surface gets in contact may also make sense. Another exemplary possibility is to provide the non-planar bearing surface of the supporting ring with a coating increasing friction to attain increased friction in the system. For example, the surface may also be abrasive-blast. Any arrangement being suitable to increase friction at this place may be used.

The supporting ring includes a bore or an opening independent from its use in combination with a wheel bolt or with a wheel nut. In all cases, the supporting ring may be designed as a hollow body and/or to include a continuous expansion channel at its outer circumference to increase its elasticity. In this way, the supporting ring is designed as an elastic, resilient body which supports the chosen great clamping length of the screw element.

The supporting ring and the screw element may be made of different materials or of the same materiel having different stability. This design desires to have an influence on elasticity, to control surface pressure, to improve corrosion properties and to improve overall function of the novel fastener assembly.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2 is a view of the screw element of FIG. 1.

FIG. 3 is a view of the screw element from below.

FIG. 4 is a view of the supporting ring from above.

FIG. 5 is a side view of the supporting ring of FIGS. 1 and 4.

FIG. 6 is a partially cut view of the fastener assembly of FIGS. 1–5.

DETAILED DESCRIPTION

Figure 1:
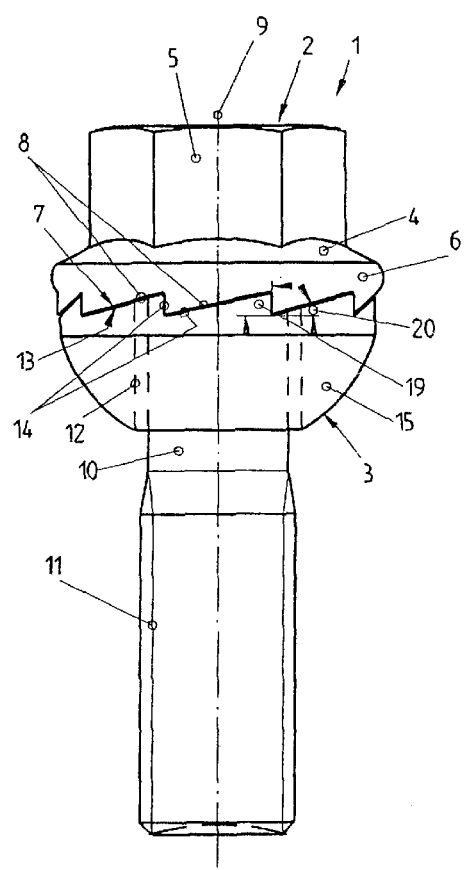
FIG. 1 is a view of a first exemplary embodiment of a fastener assembly including a screw element and a supporting ring.

Referring now in greater detail to the drawings, FIG. 1 illustrates a first exemplary embodiment of a connecting assembly or a fastener 1 as it is used to connect the wheels of a vehicle to the hub of the axle of the vehicle. The fastener 1 includes two elements or units. The first element is a screw element 2 and the second element is a supporting element or a supporting ring 3. In the illustrated embodiment of FIG. 1, the screw element 2 is designed as a screw or a bolt. The screw element 2 includes a head 4 including a surface 5 for the engagement of a wrench or a similar twisting tool. The head 4 includes an enlarged rim 6 changing into a supporting surfaces 7. The supporting surface 7 includes a plurality of surface portions commonly forming a first tooth arrangement 8 including a number of wedge shaped teeth. The supporting surface 7 may be designed to be perpendicular to an axis 9 of the fastener 1. A shank 10 is located adjacent to the supporting surface 7 and to the first tooth arrangement 8, respectively. The shank 10 beginning at its free end includes a threaded portion 11 with which the fastener 1 consisting of the screw element 2 and the supporting ring 3 is screwed into a respective counter thread being located at the vehicle.

The second element of the fastener assembly 1 is the supporting ring 3. The supporting ring 3 is a body having the shape of a ring. The supporting ring 3 has a bore 12 (FIGS. 1, 4, 5 and 6) being aligned with respect to the axis 9. In case the bore 12 (FIG. 1) has a greater diameter than the outer diameter of the threaded portion 11, the elements may be joined directly before assembly. In case the bore 12 (FIGS. 4 through 6) has a smaller diameter a than the outer diameter of the threaded portion 11 and a greater diameter a than the diameter b (FIG. 2) of the shank 10, the elements may be coupled during manufacture and before the thread of the threaded portion 11 is produced. In this way, an assembly unit is realized in which the supporting ring 3 is captively connected to the screw element 2.

A counter supporting surface or a second supporting surface 13 corresponding to the first supporting surface 7 of the screw element 2 is located at the top side of the screw element 2, meaning at the head 4. A second tooth arrangement 14 including a number of wedge shaped teeth being coordinated with the first tooth arrangement 8 of the screw element 2 is located at the counter supporting surface 13.

The supporting ring 3 at its bottom side includes a bearing surface 15. In the mounted position, the bearing surface 15 faces the threaded portion 11 of the screw element 2. In the illustrated embodiment, the bearing surface 15 has a ball-like or spherical shape.

It is already to be seen from FIG. 1 that the two associated tooth arrangements 8 and 14 are designed and arranged in a way that the supporting ring 3 is being caught by the screw element 2 during tightening of the screw element 2 when a wheel of a vehicle is being attached and when the screw element 2 is being turned in the usual clockwise sense of rotation. On the other hand, the tooth arrangements 8 and 14 slide on one another when the screw element 2 is being turned in the loosening sense of rotation. Consequently, the axial distance between the head 4 and the supporting ring 3 is increased in the direction of the axis 9. The exemplary embodiment of the fastener 1 as illustrated in FIG. 1 is mounted in a lose way, meaning that the diameter of the bore 12 is more than the outer diameter of the threaded portion 11. Thus, the supporting ring 3 is removably connected to the screw element 2.

The first tooth arrangement 8 being located at the screw element 2 will be further explained and described with respect to FIGS. 2 and 3. In the exemplary embodiment of FIGS. 2 and 3, the supporting surface 7 and the first tooth arrangement 8, respectively, includes nine teeth 16. The teeth 16 are arranged in a sense of rotation as it is to be seen from FIGS. 2 and 3 in combination with a usual right-hand thread of the threaded portion 11. Each tooth 16 includes to form surfaces 17 and 18. The form surfaces 17 extend in a radial direction with respect to the axis 9, and they are arranged to be parallel to the axis 9. The projections of the form surfaces 17 intersect the axis 9. The upright form surfaces 17 are arranged at a tangent angle 19 (FIG. 1)—seen in the circumferential direction—which is chosen to be desirably great. In the illustrated embodiment, the tangent angle 19 is approximately 90 degrees. In this way, it is ensured that there is positive engagement or form-fit between the screw element 2 and the supporting ring 3 when the screw element 2 is being tightened.

The other form surfaces 18 of each tooth 16 of the first tooth arrangement 8 being located at the screw element 2 are arranged at a comparatively smaller tangent angle 20 (FIGS. 1 and 2) in a way that the principle of an inclined plane necessary for the sliding movement of the tooth arrangements in the loosening direction is realized. In the illustrated exemplary embodiment, the form surfaces 17 and 18 are designed as plane surfaces extending from the rim 6 of the head 4 in a radial inward direction to the shank 10 of the screw element 2. Due to the design of the form surfaces 17 and 18 as plane surfaces, there only is as one respective effective tangent angle 19 and 20, respectively, independent from the respective turning position between the screw element 2 and the supporting ring 3. The tangent angle 20 is more than the inclination angle or the helix angle of the thread of the threaded portion 11 of the screw element 2.

FIGS. 4 and 5 illustrate the supporting ring 3 with its complementary design of the counter supporting surface 13 and of the second tooth arrangement 14, respectively. The second tooth arrangement 14 includes nine teeth 21 being spaced apart over the circumference. Each tooth 21 includes to form surfaces 22 and 23. The form surfaces 22 of the supporting ring 3 correspond to the form surfaces 17 of the screw element 2. Thus, the form surfaces 22 are arranged at the tangent angle 19, and they extend in a radial direction and parallel to the axis 9 such that the projections of the form surfaces 22 also intersect the common axis 9 of the fastener assembly 1. The form surfaces 23 are arranged at the tangent angle 20. They are associated with the form surfaces 18 of the screw element 2. In the illustrated first exemplary embodiment, the form surfaces 22 and 23 are also designed as plane surfaces such that a constant tangent angle 20 is used no matter in which turning position the two elements 2 and 3 are located.

The attachment of a wheel at the hub of the axle of a vehicle requires a plurality of fasteners 1. A supporting ring 3 is placed onto a screw element 2 to reach the relative position as illustrated in FIGS. 1 and 6. Then, the screw element 2 with its threaded portion 11 is inserted through a respective opening in the wheel rim to be screwed into the counter thread being located in the hub of the vehicle. During this movement, form-fit is attained between the screw element 2 and the supporting ring 3 since the form surfaces 22 of the tooth arrangement 14 are caught by the form surfaces 17 of the tooth arrangement 8. Since the supporting ring 3 is movable with respect to the screw element 2 to a certain limited extent, dividing errors (hole spacing deviations) of the wheel rim with respect to the hub of the axle of the vehicle may be compensated by a slight radial relative displacement of the elements. In this way, a secure fit of the supporting rings 3 with their bearing surfaces 15 at the respective counter surfaces at the wheel rims is realized. The design is chosen in a way that friction at this place is more than friction between the tooth segments 8 and 14 in the loosening sense of rotation. With this arrangement, it is desired to realize a sliding movement of the form surfaces 18 and 23 due to a slight unintentional self-acting loosening movement of the screw element 2 caused by great transverse forces. This means that the screw element 2 is being turned in the loosening sense of rotation with respect to the supporting ring 3 being stationary due to friction, and that the screw element 2 and the supporting ring 3 are thus pressed apart in an axial direction such that further self-acting loosening is securely prevented by an increase of pre-load forces. This arrangement provides important safety aspects. However, during intentional loosening of the fastener 1, it is necessary to turn the screw element 2 beyond a maximum moment threshold until the tooth arrangement 8 has first snapped over the tooth arrangement 14. The moment threshold may be exactly adjusted by a respective design and arrangement of the teeth with respect to the friction conditions prevailing at the surfaces of the tooth arrangements 8 and 14.

Figure 7:
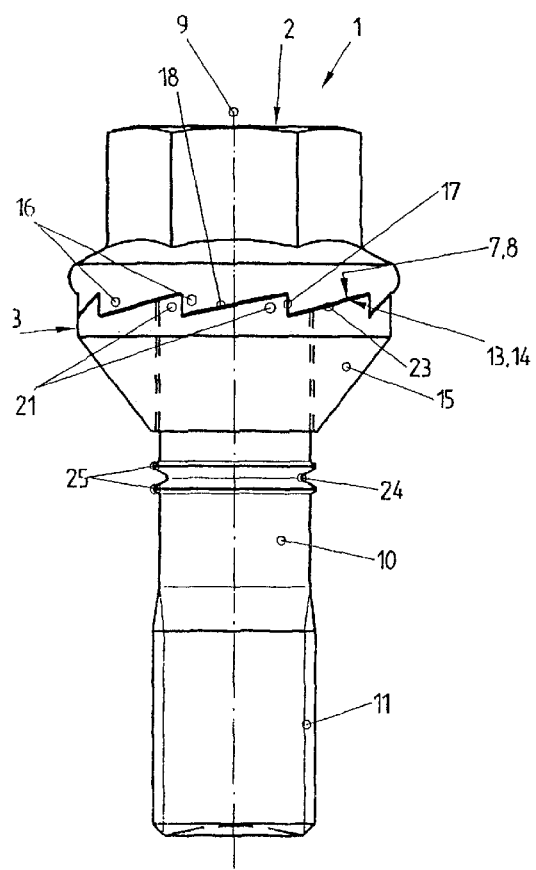
FIG. 7 is a view of a second exemplary embodiment of a fastener assembly including a screw element and a supporting ring.

The second exemplary embodiment of the fastener 1 as illustrated in FIG. 7 corresponds to the embodiment according to FIGS. 1–6 to a great extent. Consequently, it is referred to that description. The surface 15 of the supporting ring 3 is designed to have the shape of a cone. The openings being located at the wheel rim have corresponding counter surfaces. Again, the screw element 2 and the supporting ring 3 are assembled to form a captive assembly unit. A channel 24 is being produced by rolling it into the shank 10 of the screw element 2 after the supporting ring 3 has been mounted thereon. Due to the provision of the channel 24, there are two swellings 25 in which the material of the shank 10 is pushed in a radial outward direction. The diameter in the region of the swellings 25 is more than the diameter of the bore 12 of the supporting ring 3. In this way, the supporting ring 3 is captively connected to the screw element 2. This means that the supporting ring 3 cannot get detached from the screw element 2 unintentionally. However, the supporting ring 3 may still be turned with respect to the screw element 2, it may adapt to the conditions prevailing during assembly and it may move in an axial direction during the loosening movement as it corresponds to the height of the tooth arrangements 8 and 14. It is to be understood that there are other possibilities of realizing the captive arrangement of the supporting ring 3 at the screw element 2.

Figure 8:
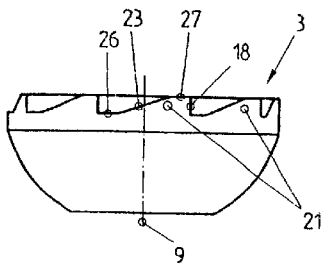
FIG. 8 is a side view of a second exemplary embodiment of the supporting ring.

FIG. 8 illustrates another exemplary embodiment of the counter supporting surface 13 and of the second tooth arrangement 14 of the supporting ring 3. It is to be seen from FIG. 8 that the tooth arrangement 14 again includes a number of teeth 21. However, the teeth 21 do not only include form surfaces 18 and 23, but also additional surface portions 26 and 27 being located at a tangent angle 0. This means that the surface portions 26 and 27 extend perpendicular with respect to the axis 9. It is to be understood that the tooth arrangement 8 at the screw element 2 has a corresponding design. In the embodiment of FIG. 8, the tangent angle 19 of the form surfaces 23 is more than the tangent angle 19 of the form surfaces 23 in accordance with the exemplary embodiments of FIGS. 1–7. This provides the advantage of a smaller surface pressure occurring in the tightened state of the fastener 1 during the intentional loosening movement while the tooth arrangements 8, 14 snap over one another.

Figure 9:
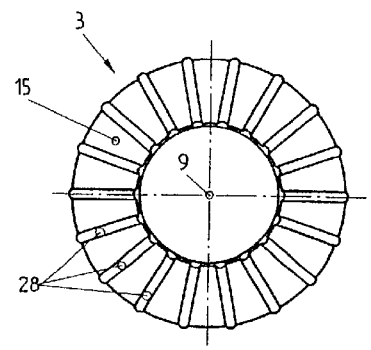
FIG. 9 is a top view of the bottom side of a third exemplary embodiment of the supporting ring.

FIG. 9 illustrates the bottom side of a another exemplary embodiment of the supporting ring 3. The bearing surface 5 being formed at the bottom side includes a number of ribs 28 being located in a radial arrangement and protruding out off the bearing surface 15 having a ball-like or a cone-like shape. These ribs 28 have the task to increase the frictional moment prevailing between the bearing surface 15 and the respective counter surface of the wheel rim in way that the frictional moment is more than the frictional moment prevailing between the tooth arrangements 8 and 14 in the loosening sense of rotation. However, friction may be increased in different ways, for example by a coating, by choosing the roughness of the bearing surface 15 in a micro range or the like.

Figure 10:
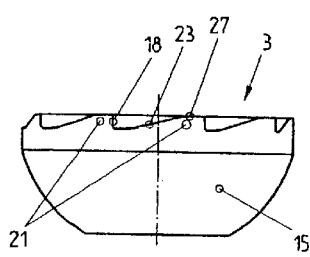
FIG. 10 is a side view of another exemplary embodiment of the supporting ring.
Figure 11:
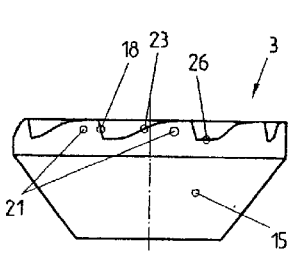
FIG. 11 is a side view of another exemplary embodiment of the supporting ring.
Figure 12:
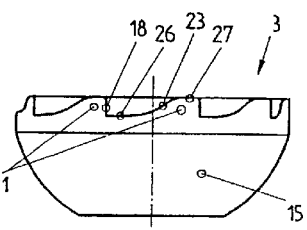
FIG. 12 is a view of another exemplary embodiment of the supporting ring similar to FIG. 4.

FIGS. 10–12 illustrate different exemplary embodiments of the form surfaces 18 and 23 of the teeth 21 with reference to the supporting ring 3. It is to be understood that a complementary or a differently adapted design is realized at the tooth arrangement 8 of the respective screw element 2. It will be seen from FIGS. 10–12 that the form surfaces 18 and 23 may also have a curved or bent design. This applies especially to the form surface 23, while the form surface 18 emphasizes the fact that it is also possible to use different tangent angles 19. To realize the form-fit, it is possible to use a tangent angle 19 of less than 90 degrees (FIG. 11). According to the exemplary embodiment of FIG. 10, the form surface 23 is directly connected with the form surface 18. In its starting region, the form surface 23 has a very small tangent angle which however increases during further rotational movement of the elements with respect to one another. Thus, the tangent angle 20 is not constant over the relative turning movement occurring between the supporting ring 3 and the screw element 2. At the beginning, the tangent angle 20 has relatively small value, and it increases to reach a relatively great value towards the ending of the possible turning movement before the snapping movement takes place. The enlargement and the increase respectively of the tangent angle in the loosening sense of rotation may be designed usefully in such a manner to prevent the sliding movement of the wedge shaped teeth 8 and 14 in the loosening direction. Thus wear is reduced and the fastener assembly can be used again and again.

In the embodiment according to FIG. 11, a surface portion 26 is connected to the form surface 18 at a tangent angle of 0. The form surface 23 has the shape of an S, and it has a faster increasing tangent angle 20 which decreases in the following.

In the embodiment of FIG. 12, the tangent angle 20 of the form surface 23 also changes over the turning portion. Additionally, plane surface portions 26 and 27 are located between the form surfaces 18 and 23.

Figure 13:
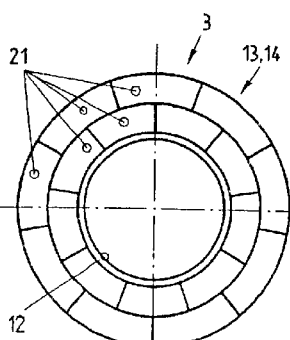
Figure 14:
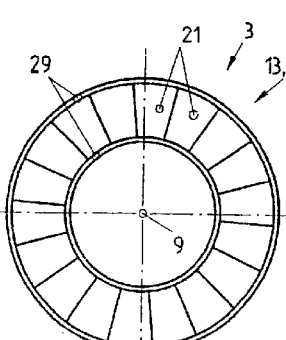
FIG. 14 is a top view of another exemplary embodiment of the supporting ring.
Figure 15:
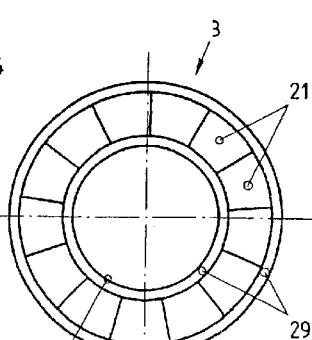
FIG. 15 is a top view of another exemplary embodiment of the supporting ring.

FIGS. 13–15 illustrate top views of possible exemplary embodiments of the counter supporting surfaces 13 and of the tooth arrangement 14. FIG. 13 makes it clear that the teeth 21 of the tooth arrangement 14 may not only be designed to be continuous in a radial direction, but they may also be designed as two spaced apart ring-like structures. In the embodiment of FIG. 14, the teeth 21 are fully continuous in a radial inward direction and in a radial outward direction. Plane surface rings 29 limiting the structure of the teeth 21 are located at the inside and at the outside. Although these illustrated embodiments show nine teeth 21, it is to be understood that a different number of teeth, for example seven, eight or eleven teeth, may be arranged about the circumference. FIG. 15 illustrates an embodiment in which the plane surface rings 29 have a wider design than it is the case in the embodiment of FIG. 14.

Figure 17:
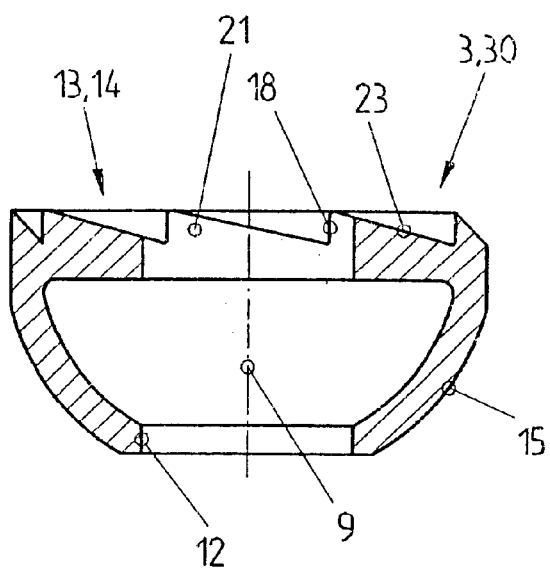
FIG. 17 is a sectional view of the supporting ring of FIG. 16 along line XVII—XVII.
Figure 16:
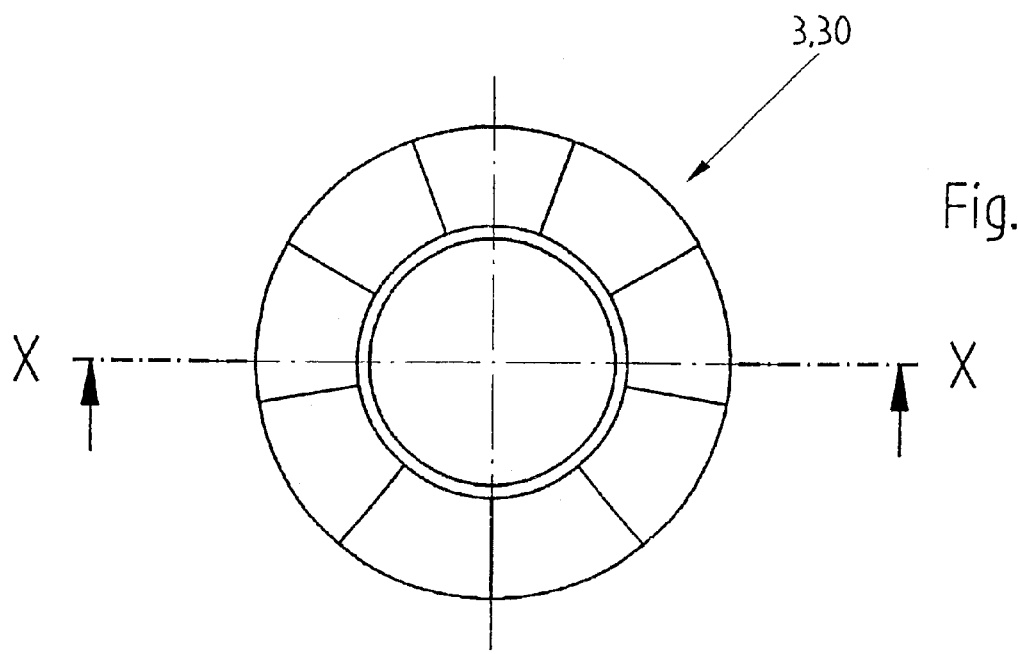
FIG. 16 is a top view of another exemplary embodiment of the supporting ring being designed as a hollow body.

FIGS. 16 and 17 illustrate another exemplary embodiment of the supporting ring 3. In this case, the supporting ring 3 is designed as a hollow body 30. Compared to the afore-mentioned exemplary embodiments of the supporting ring 3, such a hollow body 30 is a more elastic component. The elasticity is intentionally increased. In this way, the entire elasticity of the fastener assembly 1 is increased. Especially in combination with a great clamping length of the screw element 2, an increase of elasticity is advantageous. The increased elastic design of the hollow body 30 and of the supporting ring 3, respectively, allows for a better adaptation of the bearing surface 15 of the supporting ring 3 with respect to the corresponding counter surface being located at the wheel rim. In this way, friction and the frictional moment, respectively, prevailing at this place are increased.

Figure 18:
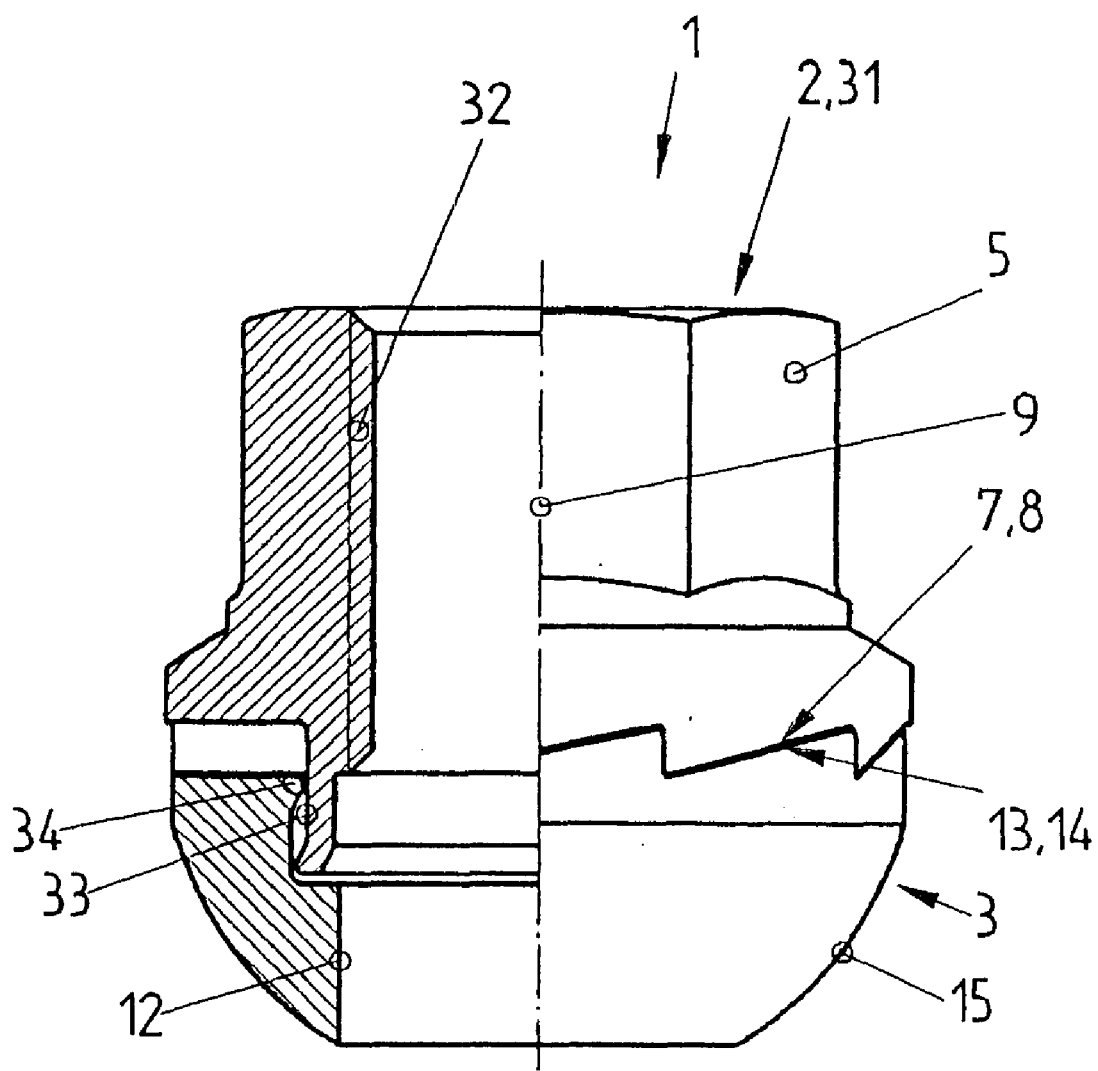
FIG. 18 is a view and a semi cut of a fastener assembly including a screw element and a supporting ring.

FIG. 18 finally illustrates an application of the invention in which the screw element 12 is not designed as a wheel bolt, but instead as a wheel nut 31. A supporting ring 3 is associated with the wheel nut. It is to be understood that the wheel nut 31 has an open design, and that it includes an inner thread 32. The wheel nut 31 at its side facing towards the supporting ring 3 includes a protrusion 33 which may be calked after the assembly of the supporting ring 3 and the wheel nut 31 in a way that the protrusion 33 captively engages a collar 34 being located at the supporting ring 3. In this way, a captive assembly unit being suitable for robots is realized. The screw element 2 and the wheel nut 31, respectively, again includes the supporting surface 7 including the first tooth arrangement 8. Accordingly, the supporting ring 3 includes the counter supporting surface 13 and the second tooth arrangement 14. The tooth arrangements 8 and 14 each including a wedge shaped teeth may include plane or non-plane form surfaces, as this has already been described with respect to the exemplary embodiments of FIGS. 1-17.

Many variations and modifications may be made to the preferred embodiments of the invention without departing substantially from the spirit and principles of the invention. All such modifications and variations are intended to be included herein within the scope of the present invention, as defined by the following claims.

We claim:

1. A detachable fastener assembly for a wheel of a vehicle, comprising:
   a screw element including a threaded portion, a first supporting surface and a number of first wedge shaped teeth being located at said supporting surface; and
   a supporting ring being rotatably connected to said screw element, said first supporting surface being designed and arranged to transmit an axial force to said supporting ring,
   said supporting ring including a second supporting surface, a non-planar bearing surface being designed to transmit an axial force onto a wheel of a vehicle in the mounted position and a number of second wedge shaped teeth being associated with said first wedge shaped teeth,
   said first wedge shaped teeth each including a first form surface and a second form surface and being located at said first supporting surface to face said supporting ring and said second wedge shaped teeth each including a first form surface and a second form surface and being located at said second supporting surface to face said screw element, said first and second form surfaces being inclined in a circumferential direction, said second form surfaces being designed to be at least partially non-planar,
   said first form surfaces of said first and second teeth contacting each other and being arranged at a relatively great average tangent angle to realize positive engagement between said screw element and said supporting ring in a tightening sense of rotation when said fastener assembly is being tightened and said second form surfaces of said first and second teeth contacting each other and being arranged at a relatively small average tangent angle to make said first and second wedge shaped teeth slide on one another and to press said screw element and said supporting ring apart under an increase of the axial force in a tightening sense of rotation when said fastener assembly is being loosened.

2. The fastener assembly of claim 1, wherein the respective effective tangent angle of said second form surfaces of the screw element and the supporting ring contacting each other in a loosening sense of rotation is more than a helix angle of said threaded portion.

3. The fastener assembly of claim 1, wherein said supporting ring is connected to said screw element to be captive but movable.

4. The fastener assembly of claim 1, wherein said non-planar bearing surface is designed to have increased friction.

5. The fastener assembly of claim 4, wherein said non-planar bearing surface includes a number of ribs.

6. The fastener assembly of claim 4, wherein said non-planar bearing surface includes a number of strip-like protrusions.

7. The fastener assembly of claim 4, wherein said non-planar bearing surface includes a coating being designed to increase friction.

8. The fastener assembly of claim 4, wherein said non-planar bearing surface is abrasive-blast.

9. The fastener assembly of claim 1, wherein said supporting ring is designed as a hollow body to increase its elasticity.

10. The fastener assembly of claim 9, wherein said supporting ring at its outer circumference includes a continuous elastic channel to increase its elasticity.

11. The fastener assembly of claim 1, wherein said supporting ring at its outer circumference includes a continuous elastic channel to increase its elasticity.

12. The fastener assembly of claim 1, wherein said supporting ring and said screw element are made of different materials.

13. The fastener assembly of claim 1, wherein said supporting ring and said screw element are made of the same material having different stability.

14. The fastener assembly of claim 1, wherein said screw element is a wheel bolt.

15. The fastener assembly of claim 1, wherein said screw element is a wheel nut.

* * * * *